(12) United States Patent
Nolte et al.

(10) Patent No.: US 8,040,598 B2
(45) Date of Patent: Oct. 18, 2011

(54) MICROSCOPE FOR OBSERVING A SAMPLE IN THE BRIGHT FIELD ILLUMINATION BY TRANSMITTED LIGHT OR IN FLUORESCENCE-CONTRAST EPI-ILLUMINATION

(75) Inventors: Andreas Nolte, Rodorf/OT Lemshausen (DE); Thomas Bocher, Goettingen (DE); Ingo Fahlbusch, Goettingen (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 763 days.

(21) Appl. No.: 12/138,081

(22) Filed: Jun. 12, 2008

(65) Prior Publication Data

US 2008/0310017 A1 Dec. 18, 2008

(30) Foreign Application Priority Data

Jun. 12, 2007 (DE) .......................... 10 2007 027 084

(51) Int. Cl.
*G02B 21/06* (2006.01)
(52) U.S. Cl. ....................................... 359/388; 359/390
(58) Field of Classification Search .................. 359/381, 359/385, 388, 390
See application file for complete search history.

(56) References Cited

U.S. PATENT DOCUMENTS

| | | | |
|---|---|---|---|
| 4,753,525 A | 6/1988 | Gaul et al. | |
| 4,756,611 A * | 7/1988 | Yonekubo et al. | 359/370 |
| 5,404,238 A * | 4/1995 | Dreessen et al. | 359/385 |
| 5,703,714 A | 12/1997 | Kojima | |
| 6,219,180 B1 * | 4/2001 | Hasegawa et al. | 359/387 |
| 6,222,671 B1 * | 4/2001 | Ogihara | 359/390 |
| 6,337,767 B1 * | 1/2002 | Takeuchi | 359/388 |
| 6,347,009 B1 * | 2/2002 | Takeuchi | 359/385 |
| 6,384,967 B1 * | 5/2002 | Watanabe et al. | 359/385 |
| 6,636,353 B2 * | 10/2003 | Yamaguchi et al. | 359/381 |
| 7,042,638 B2 | 5/2006 | Gonschor et al. | |
| 7,602,555 B2 * | 10/2009 | Kawasaki et al. | 359/656 |
| 2005/0111090 A1 | 5/2005 | Kleinteich et al. | |
| 2007/0041091 A1 * | 2/2007 | Takeuchi | 359/386 |
| 2007/0236785 A1 * | 10/2007 | Matsumoto | 359/381 |

FOREIGN PATENT DOCUMENTS

| | | |
|---|---|---|
| DE | 1 041 266 | 5/1954 |
| DE | 36 10 692 A1 | 10/1987 |
| DE | 102 29 935 A1 | 1/2004 |
| DE | 103 55 523 A1 | 8/2005 |
| JP | 06051204 A * | 2/1994 |

* cited by examiner

*Primary Examiner* — Mark Consilvio
(74) *Attorney, Agent, or Firm* — Patterson Thuente Christensen Pedersen, P.A.

(57) ABSTRACT

A microscope for observing an object selectably using the bright-field transmitted light contrast procedure or the incident-light fluorescence contrast procedure. During the bright-field transmitted light contrast procedure, an illumination beam path is directed from a bright-field light source to the object and an imaging beam path is directed from the object through the microscope objective into the microscope tube, which includes a fluorescence unit that includes a fluorescence excitation light source, an illumination optical system, a filter set having at least one excitation filter and at least one emission filter, as well as a beamsplitter. The fluorescence unit is mounted movably, so that in a first end position of movement the beamsplitter and the emission filter are out of the imaging beam path of the microscope and in a second end position of movement they are in the imaging beam path between the microscope objective and the microscope tube.

14 Claims, 3 Drawing Sheets

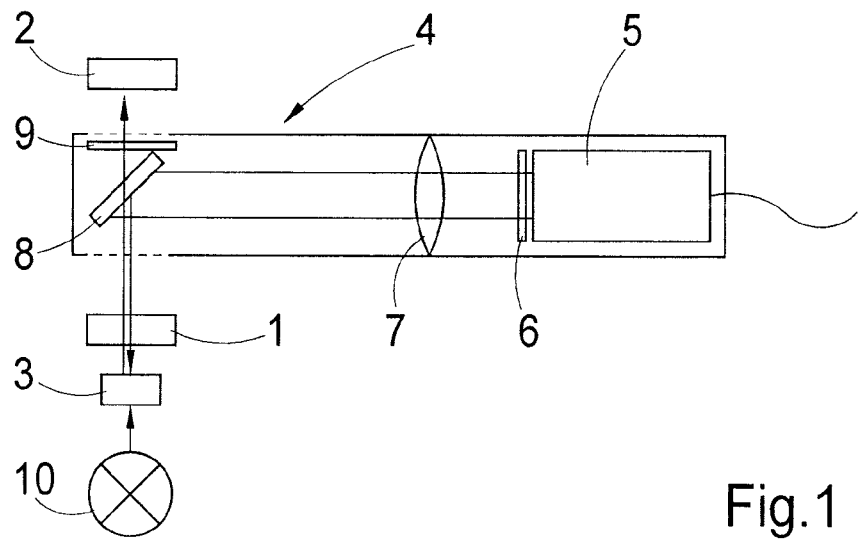
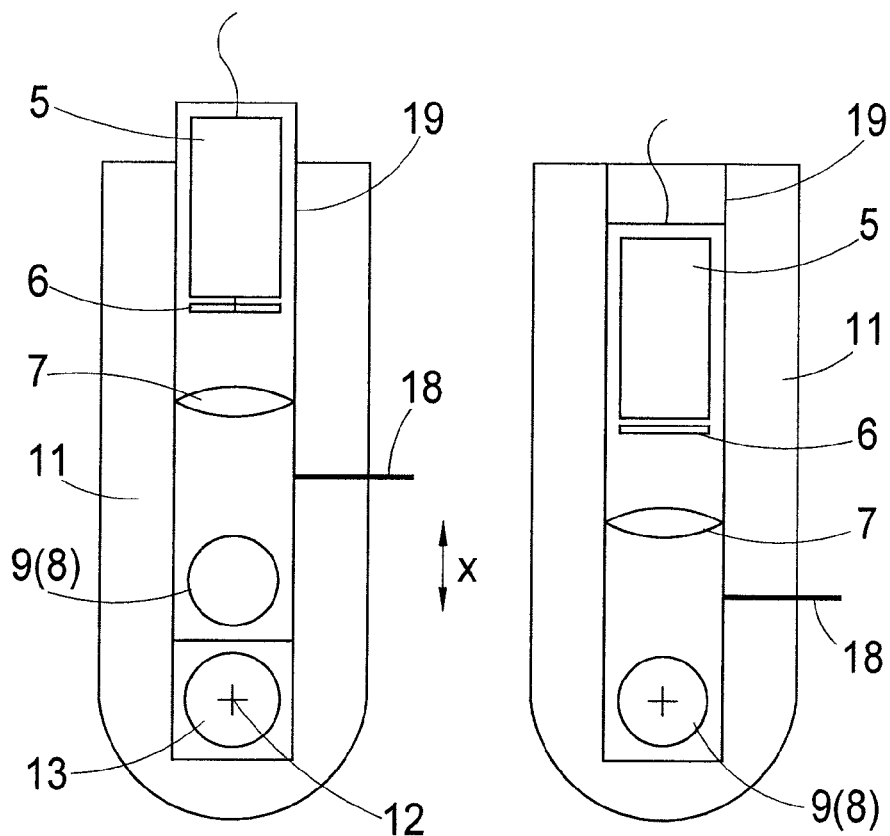
Fig.1
Fig.2    Fig.3

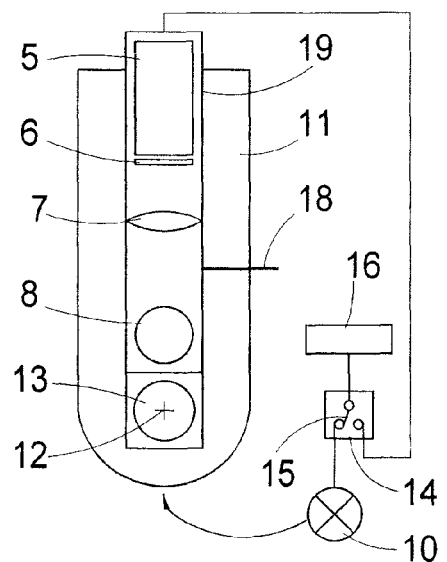
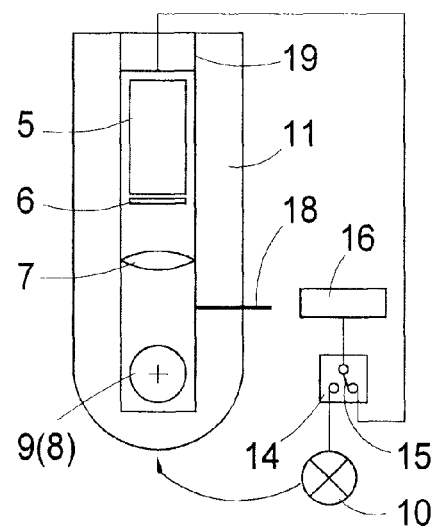
Fig.4　　　　　　　　　　　　Fig.5
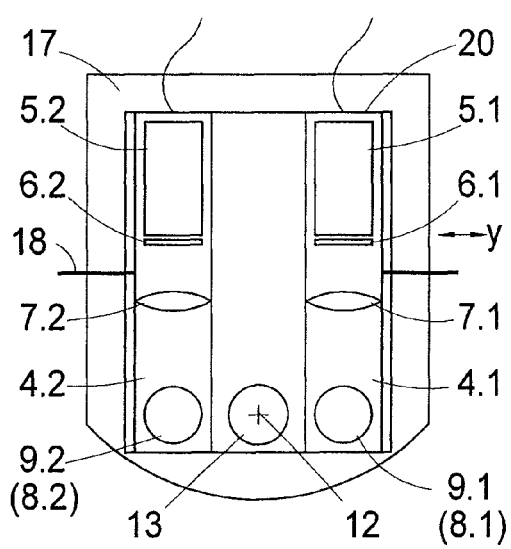
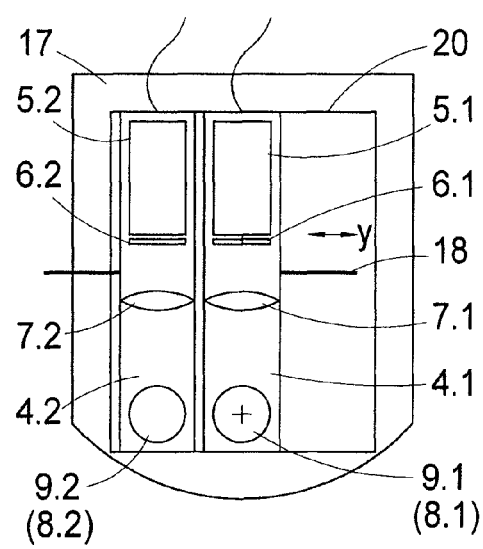
Fig.6　　　　　　　　　　　　Fig.7

MICROSCOPE FOR OBSERVING A SAMPLE IN THE BRIGHT FIELD ILLUMINATION BY TRANSMITTED LIGHT OR IN FLUORESCENCE-CONTRAST EPI-ILLUMINATION

RELATED APPLICATION

The current application claims the benefit of priority to German Patent Application No. 10 2007 027 084.6 filed on Jun. 12, 2007. Said application is incorporated by reference herein.

FIELD OF THE INVENTION

The invention concerns a microscope for observing an object selectably using the bright-field transmitted light contrast procedure or the incident-light fluorescence contrast procedure.

BACKGROUND

In microscopes, particularly in light microscopes for observing objects with the bright-field transmitted light contrast procedure, a microscope beam path is directed from a bright-field light source through the object and through the microscope objective into the microscope tube.

Microscopes that are further developed for observing the object in the incident-light fluorescence contrast procedure also have a fluorescence system comprising essentially the following components:
  a multispectrally emitting light source, such as an HBO arc lamp with a line spectrum, or
  an XBO arc lamp with a continuous spectrum, or
  a light source that emits over a narrow band, such as a LED (light-emitting diode), and
  optical elements to image the light source in the object,
  excitation filters to select the color of the illumination,
  a beamsplitter, and
  emission filters to select the color for imaging of the object.

The light source is usually placed outside the microscope structure and coupled through an illumination connection. A set of excitation filters is placed in a mechanical changing means, such as a revolver or a slide moving transversely to the optical axis, so that the excitation filters can be placed in the illuminating beam bath, depending on their optical properties and on the object properties. Likewise a set of emission filters.

When the light source is an arc lamp, a shutter is provided to interrupt the illuminating light. When a LED is used as the light source, the illuminating light can [be controlled] by switching the operating voltage for the LED on and off.

The microscope can be changed from operating in the incident-light fluorescence contrast procedure to the bright-field transmitted light contrast procedure by, for example, setting the changing means for the filter sets to a blank position, so that the illuminating light coming from a bright-field light source can pass unfiltered. At the same time, the shutter is closed, or the operating voltage for the fluorescence excitation light source is interrupted and the bright-field light source is switched on. The bright-field light source can at the same time be adjusted to a preset brightness.

The present invention refers particularly to fluorescence systems with one or more LEDs as the light source for the incident-light fluorescence illumination.

Microscopes constructed in this manner are known principally from two manufacturers.

One of those is the company "FRAEN CORPORATION S.r. 1.; Via Stelvio, 12; 20019 Settimo Milanese—MI".

In that case, the change between incident-light fluorescence contrast and bright-field transmitted light contrast is accomplished by sliding a mirror into or out of the beam path, so that when the mirror is pushed in the object is illuminated by an LED in incident-light fluorescence and when the mirror is pulled out the object is illuminated by the bright-field light source in bright-field transmitted light. At the same time the mirror is moved, the LED must be switched on or off and a filter slide must be moved back and forth to change between a filter position and a blank position.

The fluorescence unit is designed as an add-on for light microscopes which by themselves are operated with the transmitted light procedure and are operated manually. This add-on system has the disadvantage that it is relatively complicated. In addition, four hand operations are needed every time to change between incident-light fluorescence contrast and bright-field transmitted light contrast.

In the applicable microscopes of the second manufacturer, the company "EUROIMMUN AG", Seekamp 31, D-23560 Lübeck", the incident-light fluorescence contrast operating mode is selected by sliding a filter set into the illumination beam path while simultaneously switching on a LED as the light source for the fluorescence excitation.

In this case, three hand operations are needed every time to change between incident-light fluorescence contrast and bright-field transmitted light contrast. There is a further disadvantage that because of a mechanical separation of a solidly built-in filter set and a solidly built-in light source it is impossible for the customer to select different fluorescence wavelengths.

Because of that, the object of the invention is to make possible, for a microscope of the type initially described, a less time-consuming but ergonomically improved change between incident-light fluorescence contrast and bright-field transmitted light contrast and the reverse.

SUMMARY OF THE INVENTION

The objective is attained according to the invention for a microscope in which, during the bright-field transmitted light contrast procedure, an illuminating beam is directed from a bright-field light source to the object and an imaging beam path from the object through the microscope objective into the microscope tube, by means of
  a fluorescence excitation light source, an illumination optical system, a filter set comprising at least one excitation filter and one emission filter, and a beamsplitter are combined into a fluorescence unit, and
  the fluorescence unit is mounted movably, so that
  in a first end position of movement the beamsplitter and the emission filter are out of the imaging beam path of the microscope and in a second end position of movement they are in the imaging beam path between the microscope objective and the microscope tube.

The second end position corresponds to the working position for the fluorescence unit. In this position it is possible to observe the object in incident-light fluorescence contrast. To do that, the bright-field light source is switched off and the fluorescence excitation light source is switched on; the fluorescence excitation beam is directed onto the dividing layer of the beamsplitter and from there onto the object, and the emitted fluorescent radiation passes through the microscope objective and the dividing layer and the emission filter into the microscope tube.

In a preferred embodiment, the movement to the second end position of movement is linked with actuation of a switch to switch off the bright-field light source and to switch on the fluorescence excitation light source.

Alternatively, movement to the second end position of movement is linked with actuation of a separate switch to switch off the bright-field light source and a separate switch to switch on the fluorescence excitation light source, and the movement to the first end position is linked with actuation of a separate switch to switch off the fluorescence excitation light source and a separate switch to switch on the bright-field light source.

It is also conceivable, and within the framework of the invention, for there to be a switch in the region between the first and second end positions of movement to switch off the fluorescence excitation light source and switch on the bright-field light source. It is advantageous for there to be a detent at this position of the switch to prevent a manually initiated sliding movement into this position. If the detent is moved to one or the other of the end positions of the movement, then the light source assigned to that position is switched on when the particular end position of movement is reached.

The fluorescence unit is preferably mounted in a guide for sliding, and manual sliding is provided. For that purpose, the fluorescence unit can be equipped with a grip element.

As an alternative, though, it is also conceivable for the fluorescence unit to be coupled with an electrical motor drive to slide it from one end position of movement to the other. In this variant, the end positions of movement can have switches assigned, and the 'off' switch between the two end positions of movement can be connected to a control circuit connected to the electrical motor drive, by means of which the switching and movement processes already described can be produced.

In a particular embodiment of the microscope according to the invention, multiple fluorescence units are arranged slidably on a guide so that they can be moved individually into their working positions, as will be explained in more detail below by means of an example embodiment.

For example, an LED can be provided as the fluorescence excitation light source and a white light source, such as a white light LED, can be provided as the bright-field light source.

The principal advantage of the invention described above is that the ergonomics of the process are improved in comparison with the state of the art and the throughput of objects per observer and microscope is substantially increased. Potential sources of error in operation are eliminated as nearly as possible.

The fluorescence unit can be added to light microscopes in a simple manner because of its modular design.

The scope of the invention includes a microscope of the type specified initially, in which a fluorescence excitation light source, an illumination optical system, a filter set comprising at least one excitation filter and at least one emission filter, and a beamsplitter are combined into a fluorescence unit, and of the fluorescence unit, the beamsplitter and the emission filter are mounted so they are movable, so that in a first end position of movement the beamsplitter and the emission filter are out of the imaging beam path of the microscope and in a second end position of movement they are in the imaging beam path between the microscope objective and the microscope tube.

BRIEF DESCRIPTION OF THE DRAWINGS

The invention will be explained in greater detail in the following by means of example embodiments. The accompanying drawings show:

FIG. 1 A side view showing the design principle of the fluorescence unit according to the invention and its arrangement in the microscope beam path during observation of a sample with incident-light fluorescence contrast, FIG. 2 A plan view showing the position of the fluorescence unit during observation of an object in bright-field transmitted light contrast, FIG. 3 A plan view showing the position of the fluorescence unit during observation of an object in incident-light fluorescence contrast, FIG. 4 An example of the switching status of the light sources during observation of an object in bright-field transmitted light contrast, FIG. 5 An example of the switching status of the light sources during observation of an object in incident-light fluorescence contrast, FIG. 6 A plan view showing a presentation of the principle of the invention in a variant embodiment with multiple fluorescence units during observation of an object in bright-field transmitted light contrast, FIG. 7 A plan view showing the principle of the invention in a variant embodiment with multiple fluorescence units during observation of an object in incident-light fluorescence contrast.

DETAILED DESCRIPTION

Figure 8:
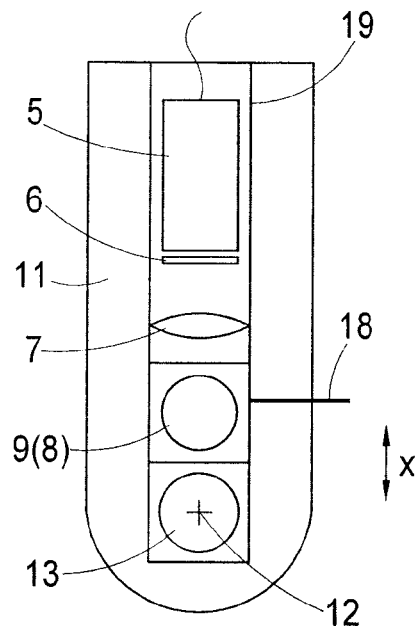
FIG. 8 A plan view showing the position of the fluorescence unit during observation of an object in bright-field transmitted light contrast in a further embodiment of the invention.

FIG. 1 shows, symbolically, the major components of the microscope beam path in connection with the description of the invention. These are the microscope objective 1 and the microscope tube 2. Likewise an object 3 being observed.

It is possible to observe the object 3 in incident-light fluorescence contrast by means of the fluorescence unit 4 according to the invention, shown in a side view in FIG. 1. For that purpose the fluorescence unit 4 has:

an LED 5, which, for example, emits light of a wavelength about 470 nm, an excitation filter 6, which in this case is transparent only to light of wavelengths from 450 nm to 490 nm, an illumination optical system 7, which provides for illuminating the object 3 with light coming from the LED 5, a beamsplitter 8, in which the dividing layer reflects excitation radiation with wavelength <500 nm and transmits the emission radiation with wavelength >500 nm, and an emission filter 9, which transmits only the emission radiation >510 nm.

The wavelengths stated refer solely to the example embodiment selected here. Thus, for example, it is conceivable and within the coverage of the invention to use LEDs 5 that emit light with different wavelengths in the range from 300 nm to 900 nm. Then the optical properties of the filters and the dividing layer must be matched properly.

If the fluorescence unit 4 is in the position shown in relation to the microscope beam path with the components microscope objective 1 and microscope tube 2, and if the LED 5 is switched on as the light source, then the object 3 is illuminated with light of wavelength about 470 nm. If the object 3 is made up of a substance that is excited to fluorescence at this wavelength, or if particles of such a substance pass through the object 3, then the emission radiation from the object 3, such as the light described of wavelength >510 nm is collected by the microscope objective 1 and passes through the divider layer of the beamsplitter 8 and through the emission filter 9 into the microscope tube 2, so that object 3 can be observed through the microscope tube 3.

In this position of the fluorescence unit the emission filter 9, like the beamsplitter 8, is in the imaging beam path and is arranged between the beamsplitter 8 and the microscope tube 2.

The fluorescence unit 4 is of modular design according to the invention. That is, it makes up a building block comprising the components LED 5, excitation filter 6, illumination optical system 7, beamsplitter 8 and emission filter 9.

If the fluorescence unit 4 is removed from the microscope beam path and if a light source viewed by the microscope objective 2 with respect to the object 3, such as a bright-field light source 10, is switched on, then it is possible to observe the object 3 in bright-field transmitted light contrast.

So that one can make such a change between the incident-light fluorescence contrast process and the bright-field transmitted light contrast process in a simpler and less time-consuming manner, the fluorescence unit 4 is mounted according to the invention in a guiding slide 19, as shown in principle in FIG. 2, and can be slid in the directions of the arrow X.

Here the range of sliding is limited by two end positions of movement, so that in a first end position of movement the beamsplitter 8 and the emission filter 9 are outside the imaging beam, and in a second end position of movement they are in the imaging beam between the microscope objective 1 and the microscope tube 2.

FIG. 2 shows a plan view of the fluorescence unit 4 in the direction of the optical axis 12 of the imaging beam, in its position in the first end position of movement. As can be seen, in this end position of movement the beamsplitter 8 and the emission filter 9 are out of the cross-sectional area 13 of the imaging beam, that centrally surrounds the optical axis 12.

In this case, as described previously by means of FIG. 1, if the bright-field light source 10 is switched on, the object 3 can be observed in bright-field transmitted light contrast.

To be able to observe the object 3 in incident-light fluorescence contrast, on the other hand, it is necessary only to slide the fluorescence unit 4 into the second end position of movement. That can be accomplished, for example, by a slight push exerted manually on a grip element 18.

After it has slid, the fluorescence unit 4 is in the position shown in FIG. 3, that is, its second end position of movement. It can be seen that the beamsplitter 8 and the emission filter 9 now cover the cross-sectional area 13 of the imaging beam.

In this arrangement, as previously described by means of FIG. 1, if the bright-field light source 10 is switched off and the LED 5 on, the object 3 can be observed in incident-light fluorescence contrast.

In a preferred embodiment, which will be explained by means of FIGS. 4 and 5, the reaching of the first end position of movement of the fluorescence unit 4 is linked with actuation of a switch 14. If the first end position of movement is reached, the switch 14 switches the bright-field light source 10 on and the LED 5 off. On leaving the first end position of movement, the switch 14 switches the bright-field light source 10 off and the LED 5 on.

In this respect, FIG. 4 shows the fluorescence unit in the first end position of movement, for example, while FIG. 5 shows the fluorescence unit in the second end position of movement.

The indicated position of the switch contact 15 in the switch 14 refers to the light source switched on in each case. The switching on and off are caused by making or breaking an electrically conductive contact between a power supply unit 16 and the particular light source, that is, the bright-field light source 10 or the LED 5.

FIGS. 6 and 7 show the principle of the invention in a variant embodiment with multiple fluorescence units, in this case with one fluorescence unit 4.1 and a fluorescence unit 4.2. The fluorescence units 4.1, 4.2 are, with respect to the nature of their components, LEDs 5.1, 5.2; excitation filters 6.1, 6.2; illumination optical system 7.1, 7.2; beamsplitters 8.1, 8.2, and emission filters 9.1, 9.2, of essentially the same design. They differ only in the wavelengths of the excitation radiation with which the object 3 is illuminated.

Both fluorescence units 4.1 and 4.2 are mounted in a guide 20, in which they can be slid individually in the arrow directions Y.

FIG. 6 shows, for example, the possibility of observing the object 3 in bright-field transmitted light contrast. Both fluorescence units 4.1, 4.2 are in one slide position in which none of their beamsplitters 8.1 or 8.2 and emission filters 9.1 or 9.2 cover the cross-sectional area 13 of the imaging beam. If the bright-field light source 10 is switched on in this situation, the object 3 can be observed in bright-field transmitted light contrast.

From this situation, the fluorescence unit 4.1 or 4.2 can selectably be slid in the arrow direction Y until the beamsplitters 8.1 or 8.2 and the emission filters 9.1 or 9.2 cover the cross-sectional area 13 of the imaging beam, as is shown in FIG. 7 with fluorescence unit 4.1.

Now if the bright-field light source 10 is switched off and the LED 5.1 is switched on, the object 3 can be observed in incident-light fluorescence contrast.

By selecting the fluorescence units 4.1 or 4.2 to be slid, the wavelength of the fluorescence excitation radiation with which object 3 is to be illuminated can accordingly be selected, depending on the optical properties of the filter set.

It is within the range of the invention for the fluorescence units 4, 4.1, 4.2 and the guides 19, 20, to either be contained solidly within the body of the microscope or arranged in an intermediate tube 11, 17. In the latter case, the unit can be removed as a module. It can also be attached simply in the sense of an add-on for the microscope.

Further, it is also possible to place more than two fluorescence units in the guide together. In this case the sliding of the fluorescence units should not be mechanically coupled together.

It is also conceivable to place the fluorescence units on a revolver. By rotating the revolver, the different fluorescence units can be moved into the imaging beam. Then a blank position of the revolver must be maintained for bright-field observation.

An embodiment in which the beamsplitter 8 and the emission filter 9 are mounted movably while the fluorescence excitation light source, particularly in the form of a LED 5, the illumination optical system 7 and the filter set, which comprises at least one excitation filter 6 remain at rest with respect to the other parts of the microscope is included in the scope of the invention.

In this manner the effect explained above by means of the example embodiments according to FIGS. 1 to 7 is accomplished with the technical means available according to the invention.

Figure 9:
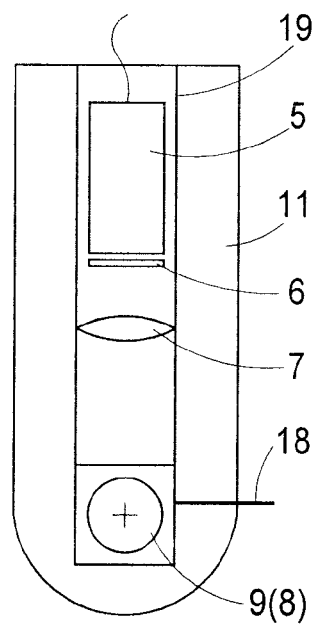
FIG. 9 A plan view showing the position of the fluorescence unit during observation of an object in incident-light fluorescence contrast, according to the further embodiment according to FIG. 8.

As shown in FIG. 8, here, too, the beamsplitter 8 and the emission filter 9 are out of the imaging beam path at a first end position of movement. On the other hand, FIG. 9 shows the beamsplitter 8 and the emission filter 9 in a second end position of movement at which they are positioned in the imaging beam path of the microscope.

Figure 10:
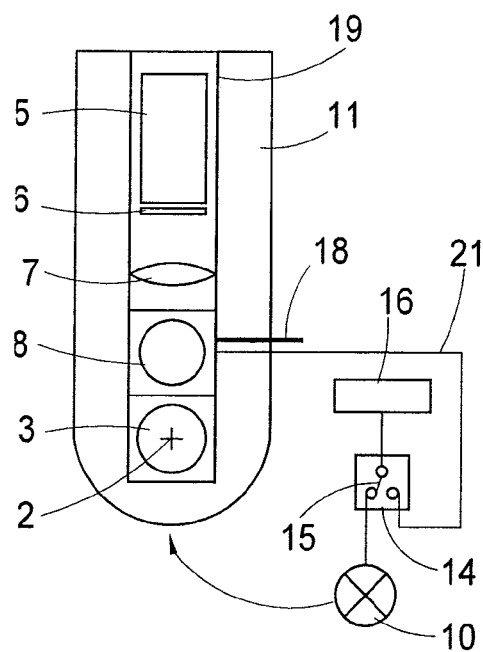
FIG. 10 Another example of the switching status of the light sources during observation of an object in bright-field transmitted light contrast.
Figure 11:
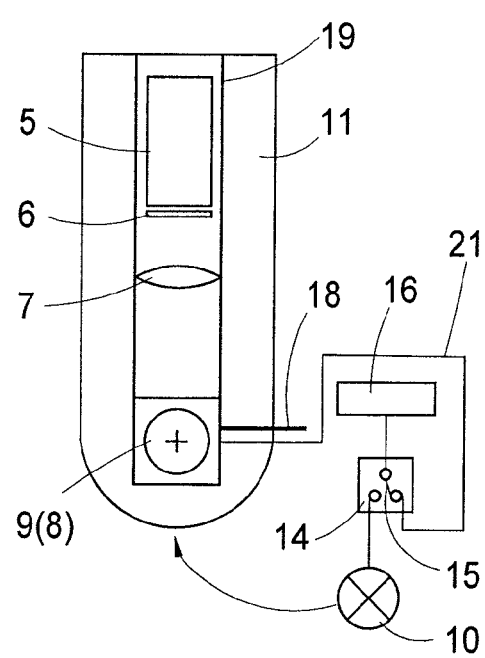
FIG. 11 Another example of the switching status of the light sources during observation of an object in incident-light fluorescence contrast.

As for the embodiments explained by means of FIGS. 4 and 5, here, too, the attainment of the first end position of movement by the beamsplitter 8 and the emission filter 9 can be linked with actuation of the switch 14, as shown in FIGS. 10 and 11.

The only difference in the construction is that the switch 14 is not controlled in dependence on the change of position of all the parts of the fluorescence unit 4, but in dependence on the change of position of the beamsplitter 8 and the emission filter 9, as clarified in FIGS. 10 and 11 with the connecting line 21.

In this connection, FIG. 10 shows the position of the beamsplitter 9 and the emission filter 9 in the first end position of movement, while FIG. 11 shows the position of the beamsplitter 8 and the emission filter 9 in the second end position of movement.

Here, again, the position shown for the switch contact 15 in the switch 14 indicates the light source that is switched on, with the switching on and off likewise caused by making or breaking of an electrically conducting connection between a power supply unit 16 and the particular light source, that is, the bright-field light source 10 or the LED 5.

LIST OF REFERENCE CHARACTERS

1 Microscope objective
2 Microscope tube
3 Object
4, 4.1, 4.2 Fluorescence unit
5, 5.1, 5.2 LED
6, 6.1, 6.2 Excitation filter
7, 7.1, 7.2 Illumination optical system
8, 8.1, 8.2 Beamsplitter
9 Emission filter
10 Bright-field light source
11 Intermediate tube
12 Optical axis
13 Cross-sectional area
14 Switch
15 Switch contact
16 Power supply unit
17 Intermediate tube
18 Grip element
19 Guide
20 Guide
21 Connecting line
X, Y Arrow directions

The invention claimed is:

1. A microscope, designed for observing an object selectably in bright-field transmitted light contrast or in incident-light fluorescence contrast, in which a microscope beam path is directed from a bright-field light source through the object and a microscope objective into a microscope tube, comprising:
a fluorescence unit including a fluorescence excitation light source, an illumination optical system, a filter set comprising at least one excitation filter, at least one emission filter, and a beamsplitter;
wherein the fluorescence unit is mounted so that it is movable, such that
in a first end position of movement the beamsplitter and the emission filter are outside the imaging beam path of the microscope and in a second end position of movement the beamsplitter and the emission filter are in the imaging beam path between the microscope objective and the microscope tube.

2. The microscope according to claim 1, wherein
in the second end position the bright-field light source is switched off and the fluorescence excitation light source is switched on,
the fluorescence excitation light beam is directed onto the dividing layer of the beamsplitter and from there onto the object, and
the fluorescence emission beam coming from the object is directed through the microscope objective, the dividing layer and the emission filter and into the microscope tube.

3. The microscope according to claim 1, in which the movement of the fluorescence unit to the second end position of movement is linked with actuation of a switch to switch the fluorescence excitation light source on and the bright-field light source off.

4. The microscope according to claim 1, in which
the movement to the first end position of movement is linked with actuation of a separate switch to switch the fluorescence excitation light source off and a separate switch to switch the bright-field light source on,
the movement to the second end position of movement is linked with actuation of a separate switch to switch the bright-field light source off and a separate switch to switch the fluorescence excitation light source on.

5. The microscope according to claim 2, further comprising a switch located between the first and second end positions of movement to switch the fluorescence excitation light source off and the bright-field light source on.

6. The microscope according to claim 5 further comprising a detent for the fluorescence unit at the position of the switch to prevent manually caused sliding in this position.

7. The microscope according claim 2, further comprising a gripping element on the fluorescence unit as an aid for sliding the fluorescence unit manually.

8. The microscope according to claim 1 further comprising an electric motor drive coupled to the fluorescence unit to move the fluorescence unit.

9. The microscope according to claim 1, further comprising an LED used as the fluorescence excitation light source and a white light source, used as the bright-field light source.

10. The microscope according to claim 1, wherein the white light source comprises a white light LED.

11. The microscope according claim 1, wherein the fluorescence unit is mounted so it can slide on a linear guide.

12. The microscope according to claim 1 further comprising additional multiple fluorescence units and wherein the fluorescence units are mounted on a linear guide so that they are individually slidable.

13. The microscope according to claim 12, wherein the fluorescence units and the linear guide are arranged in a modular exchangeable intermediate tube.

14. A microscope, designed for observing an object selectably in bright-field transmitted light contrast or in incident-light fluorescence contrast, in which, during observation in bright-field transmitted light contrast a microscope beam path is directed from a bright-field light source through the object and a microscope objective into a microscope tube, comprising:
a fluorescence unit including a fluorescence excitation light source, an illumination optical system, a filter set comprising at least one excitation filter and at least one emission filter and a beamsplitter;
wherein the fluorescence unit, the beamsplitter and the emission filter are mounted so as to be movable, such that
in a first end position of movement the beamsplitter and the emission filter are outside the imaging beam path of the microscope and in a second end position of movement the beamsplitter and the emission filter are in the imaging beam path between the microscope objective and the microscope tube.

* * * * *

UNITED STATES PATENT AND TRADEMARK OFFICE
CERTIFICATE OF CORRECTION

PATENT NO. : 8,040,598 B2
APPLICATION NO. : 12/138081
DATED : October 18, 2011
INVENTOR(S) : Nolte et al.

It is certified that error appears in the above-identified patent and that said Letters Patent is hereby corrected as shown below:

Title page, item (75) Inventors:

Andreas Nolte residence listed as "Rodorf/OT Lemshausen", correct to

--Rosdorf/OT Lemshausen--

Signed and Sealed this
Nineteenth Day of June, 2012

David J. Kappos
*Director of the United States Patent and Trademark Office*